(12) United States Patent
Wang et al.

(10) Patent No.: US 8,165,608 B2
(45) Date of Patent: Apr. 24, 2012

(54) APPARATUS AND METHOD FOR REDUCING LTE-TO-1XRTT BORDER CELL CROSS-PAGING IN CIRCUIT SWITCHED FALL BACK CALL DELIVERY

(75) Inventors: Jin Wang, Lisle, IL (US); Michael Ray Castleberry, Wheaton, IL (US)

(73) Assignee: Alcatel Lucent, Paris (FR)

( * ) Notice: Subject to any disclaimer, the term of this patent is extended or adjusted under 35 U.S.C. 154(b) by 392 days.

(21) Appl. No.: 12/571,134

(22) Filed: Sep. 30, 2009

(65) Prior Publication Data

US 2011/0077011 A1    Mar. 31, 2011

(51) Int. Cl.
*H04W 68/00* (2009.01)
(52) U.S. Cl. .......... 455/458; 455/445; 455/453
(58) Field of Classification Search .......... None
See application file for complete search history.

(56) References Cited

U.S. PATENT DOCUMENTS

2010/0113010 A1* 5/2010 Tenny et al. .......... 455/423

FOREIGN PATENT DOCUMENTS

WO    WO 98/26624 A2    6/1998

OTHER PUBLICATIONS

"Map Operations Signaling Protocols," 3GPP2 X.S0004-540-E Version 1.0.0, p. 540-87 first paragraph, p. 540-88 table and note, XP040269162, Mar. 31, 2004.
"3rd Generation Partnership Project; Technical Specification Group Services and System Aspects; Circuit Switched Fallback in Evolved Packet System; Stage 2 (Release 9)," 3GPP TS 23.272 V9.0.0, pp. 1-50, XP050363522, Jun. 1, 2009.
"Interoperability Specification (IOS) for High Rate Packet Data (HRPD) Radio Access Network Interfaces with Session Control in the Packet Control Function," 3GPP2 A.S0009-C v2.0, Sections 2.11.2.2 and 5.1.8.2, Jan. 31, 2009.
International Search Report for PCT.US2010/049739 dated Dec. 22, 2010.

* cited by examiner

*Primary Examiner* — Erika Gary
(74) *Attorney, Agent, or Firm* — Fay Sharpe LLP

(57) ABSTRACT

A technique is provided to leverage the border cell paging capability to eliminate paging waste during LTE-to-1xRTT cross-RAT paging for CSFB call delivery. A method comprises receiving a call for the user equipment at the first switching element, sending a page request to the user equipment by the first switching element via the LTE elements, sending a page invoke message by the first switching element to a plurality of switching elements on a border between the first area and the second area, the page invoke message having an indicator field indicating a status of listen only, receiving a page response from the user equipment at the second switching element, recognizing the page response by the second switching element based on the page invoke message, and, completing the call to the user equipment. This technique reduces or eliminates border cell paging waste during LTE-to-1xRTT cross-RAT paging for CSFB call delivery and also helps maximize CSFB call delivery success rates and minimize call delivery setup time.

24 Claims, 8 Drawing Sheets

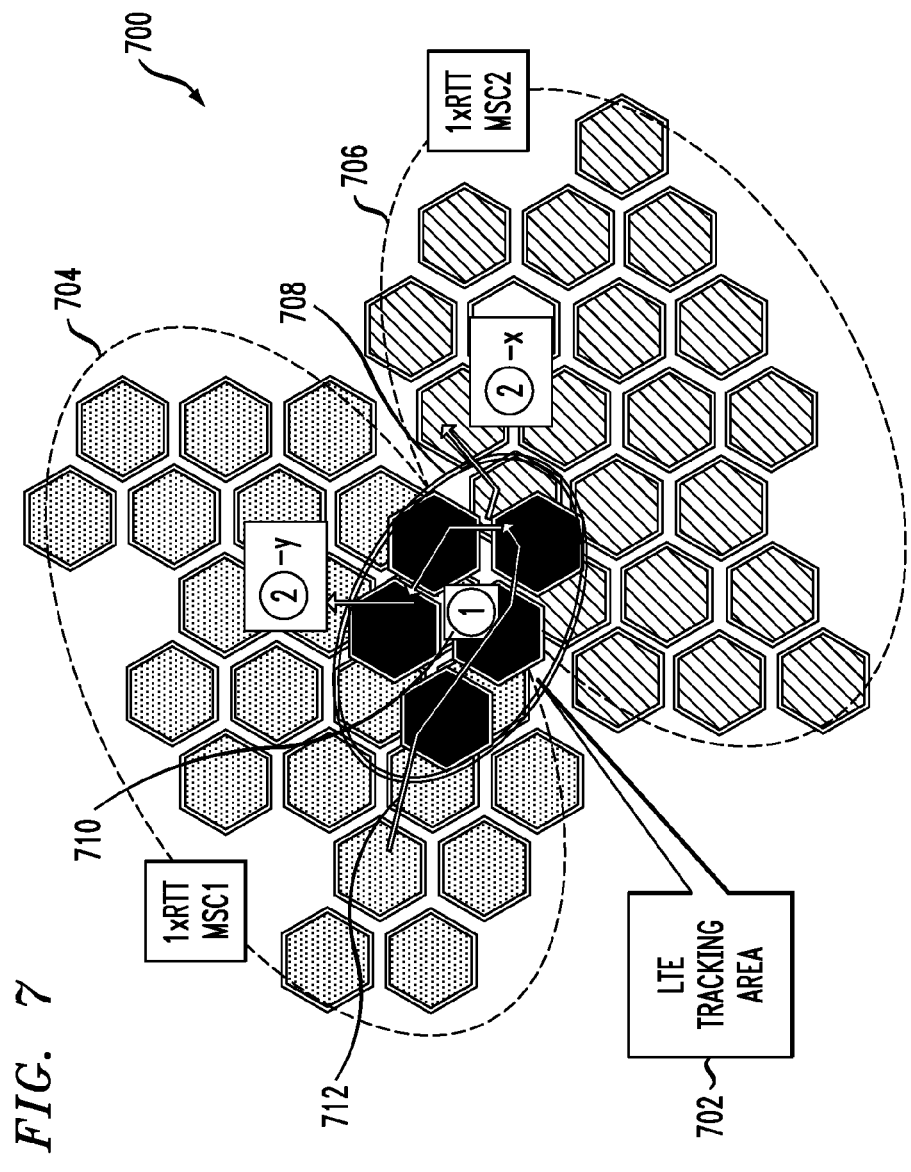
FIG. 7
① THE UE GOES IDLE IN THE LTE COVERAGE AREA
②-x THE IDLE UE MOVES OUT OF
②-y THE TA AND A VOICE INCALL ARRIVES PRIOR TO TA UPDATE
 1xRTT CELL, MSC1
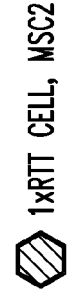 1xRTT CELL, MSC2
 LTE eNB CELL
⇧ A MOBILITY PATH OF A UE, IN IDLE MODE OR CONNECTED MODE

APPARATUS AND METHOD FOR REDUCING LTE-TO-1XRTT BORDER CELL CROSS-PAGING IN CIRCUIT SWITCHED FALL BACK CALL DELIVERY

FIELD OF THE INVENTION

This invention relates to a method and apparatus for LTE-to-1XRTT (Long Term Evolution to $1^{st}$ Generation Radio Transmission Technology) border cell cross-paging in circuit switched fall back (CSFB) call delivery.

BACKGROUND

Call delivery in networks is accomplished in a variety of manners as a function of the environment. In one example, Technical Specifications (TS) 23.272 specifies steps that support LTE-to-1XRTT Circuit Switched Fall Back (CSFB) calling delivery and LTE-to-UMTS (Universal Mobile Telecommunication System)/GSM (Global System for Mobile Communications) CSFB. If the (UMTS/GSM) MSC (Mobile Switching Center) that receives a circuit voice page response differs from the MSC that sent the page request to the UE (User Equipment), the latter invokes "Roaming retry for CSFB".

In LTE-to-UMTS/GSM CSFB, if the ISR (Idle mode Signaling Reduction) is enabled between the MSC and the underlay SGSN (Serving GPRS (General Packet Radio Service) Support Node), cross paging is performed if the UE is in an idle state, i.e., both the LTE and SGSN page the UE.

SUMMARY

"Roaming retry for CSFB" has two problems. First, it delays the voice call delivery because many updates have to be performed before paging can be retried by the "new" MSC. Second, because of the delay, the caller may either hang up or the voice incall gets a "secondary treatment" (e.g. routed to the answering machine), which reduces call delivery successful rates.

Idle mode Signaling Reduction (ISR) causes excessive paging due to cross-paging including both the LTE and SGSN.

Accordingly, a method and apparatus for reducing LTE-to-1XRTT border cell cross-paging in circuit switched fall back (CSFB) call delivery are provided.

In one embodiment, a method comprises receiving a call for the user equipment at the first switching element, sending a page request to the user equipment by the first switching element via the LTE elements, sending a page invoke message by the first switching element to a plurality of switching elements on a border between the first area and the second area, the page invoke message having an indicator field indicating a status of listen only, receiving a page response from the user equipment at the second switching element, recognizing the page response by the second switching element based on the page invoke message, and, completing the call to the user equipment.

In another embodiment, the first switching element is an anchor switching element.

In another embodiment, the second switching element is a border switching element.

In another embodiment, the page request is a 1xRTT CS page request.

In another embodiment, the page invoke message is an ISPAGE2 Invoke message.

In another embodiment, the indicator field is a PAGE Indicator field.

In another embodiment, the page response is a 1xRTT CS page response.

In another embodiment, the method further comprises sending a tunnel request acknowledgement by the LTE elements indicating a status of the user equipment and the LTE elements.

In another embodiment, the method comprises receiving a tunnel request acknowledgement indicating a status of the user equipment and the LTE elements.

In another embodiment, the method further comprises suppressing paging the UE by the LTE elements if the UE is idle and the LTE is in overload.

In another embodiment, the page invoke message is sent with the indicator field indicating listen-only if the status of the user equipment is active or the status of the LTE elements is not overload.

In another embodiment, the page invoke message is sent without the listen-only indication in the indicator field if the status of the user equipment is idle and the status of the LTE elements is overload, or if attempting a subsequent page.

In another embodiment, a system comprises a first switching element to receive a call for the user equipment, send a page request to the user equipment via the LTE elements and send a page invoke message to a plurality of switching elements on a border between the first area and the second area, the page invoke message having an indicator field indicating a status of listen only, and, a second switching element to receive a page response from the user equipment, recognize the page response based on the page invoke message and complete the call to the user equipment.

In another embodiment, the first switching element is an anchor switching element.

In another embodiment, the second switching element is a border switching element.

In another embodiment, the page request is a 1xRTT CS page request.

In another embodiment, the page invoke message is an ISPAGE2 Invoke message.

In another embodiment, the indicator field is a PAGE Indicator field.

In another embodiment, the page response is a 1xRTT CS page response.

In another embodiment, the LTE elements send a tunnel request acknowledgement indicating a status of the user equipment and the LTE elements.

In another embodiment, the first switching element is operative to receive a tunnel request acknowledgement indicating a status of the user equipment and the LTE elements.

In another embodiment, the LTE elements suppress paging the UE if the UE is idle and the LTE is in overload.

In another embodiment, the page invoke message is only sent with the indicator field indicating listen only status if the status of the user equipment is active or the status of the LTE elements is not overload.

In another embodiment, the first switching element sends the page invoke message without the listen-only indication in the indicator field if the status of the user equipment is idle and the status of the LTE elements is overload, or if attempting a subsequent page.

Further scope of the applicability of the present invention will become apparent from the detailed description provided below. It should be understood, however, that the detailed description and specific examples, while indicating preferred embodiments of the invention, are given by way of illustration only, since various changes and modifications within the spirit and scope of the invention will become apparent to those skilled in the art.

DESCRIPTION OF THE DRAWINGS

The present invention exists in the construction, arrangement, and combination of the various parts of the device, network elements, and steps of the method, whereby the objects contemplated are attained as hereinafter more fully set forth, specifically pointed out in the claims, and illustrated in the accompanying drawings in which:

FIG. 7 is a representative network to which the invention may be applied.

DETAILED DESCRIPTION

Figure 1:
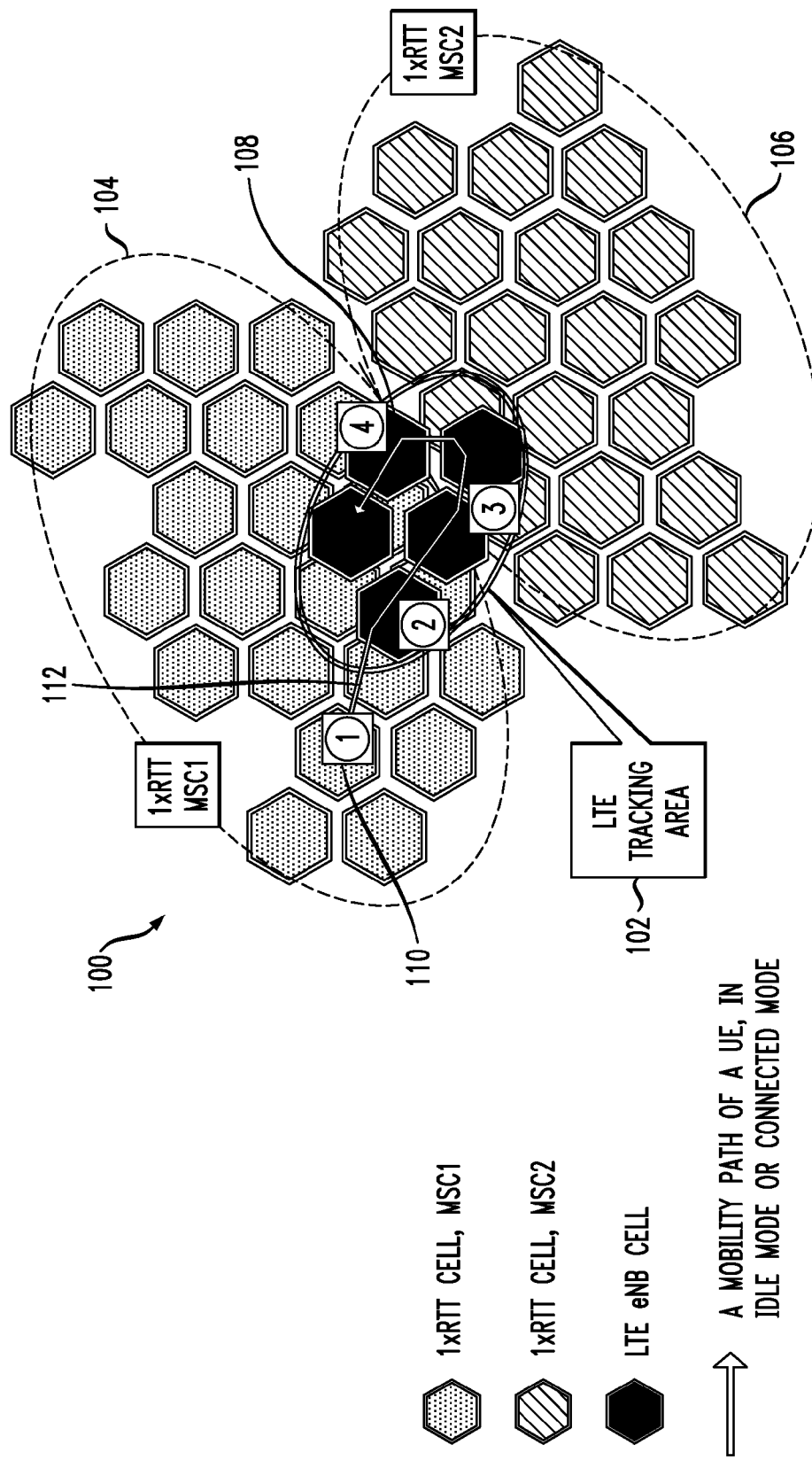
FIG. 1 is a representative network to which the invention may be applied.

FIG. 1 shows a network area 100 including a Tracking Area (TA) 102 of LTE, which spans multiple 1xRTT MSCs. MSC1 includes a plurality of cells 104. MSC2 includes a plurality of cells 106. A plurality of cells 108, which correspond to LTE eNB elements, are also provided in the tracking area 102.

As shown, at position 1, a dual-mode UE 110 in the 1xRTT-only area registers with 1XRTT MSC1. In this regard, it should be understood that the UE 110 is capable of both LTE and 1xRTT. If a voice incall arrives, it will be delivered to MSC1, the "anchor MSC" at this point.

At position 2, the UE 110 has moved along a mobility path 112 to the LTE coverage area or Tracking Area 102, re-selects & registers with LTE elements. The UE 110 selects LTE, for example, because the user wants to use LTE packet data.

At position 3, the UE 110 has moved along the mobility path 112 from MSC1 to MSC2 and registers with MSC2. At this point, if a voice incall arrives, it will be delivered to MSC2, now the "anchor MSC." The 1xRTT side of the UE maintains a ZoneTimer associated with MSC1. The Zone-Timer is in the SIB-8 broadcast info sent by the eNB (Enhanced Node B) to the UE 110.

At position 4, prior to the expiry of the ZoneTimer, the UE 110 moves back to MSC1 from MSC2. However, the UE 110 does not immediately register with MSC1 (the use of Zone-Timer here is to address the UE ping-pong issue). Thus, MSC2 remains as the "anchor MSC" prior to the expiry of the ZoneTimer. So, if a voice incall arrives, it will still be delivered to MSC2, the "anchor MSC" at this point. When the UE 110 receives the LTE-tunneled page in the MSC1 area (a "border cell" at MSC1), it sends a 1xRTT page response to the MSC1 cell as part of CSFB logic. This page response is "unsolicited" from the border MSC1 point of view. As a result, MSC1 ignores the "unsolicited page response"—since it does not know to which anchor MSC the page response should be forwarded. Thus, the CSFB call delivery fails in this scenario.

Figure 2:
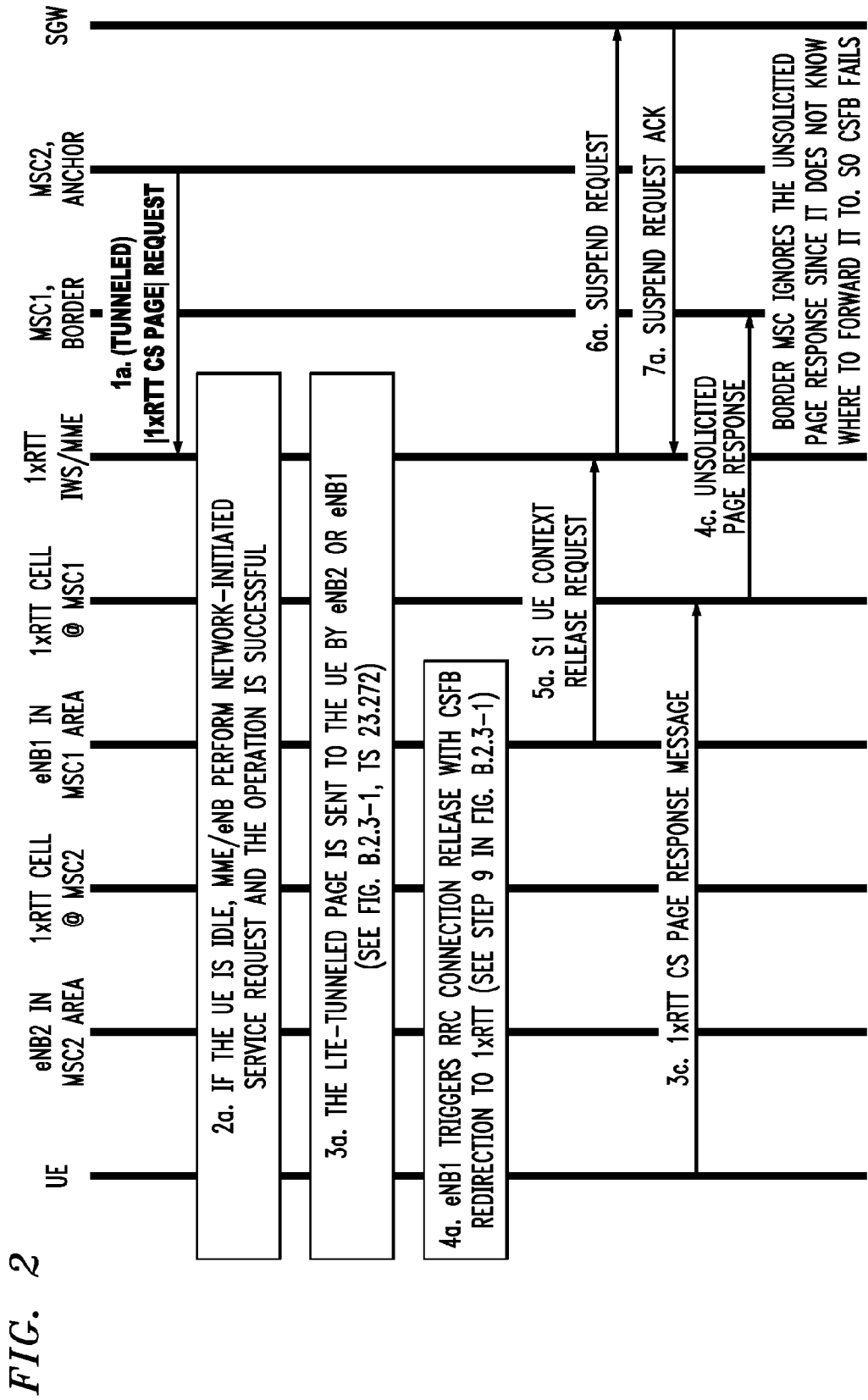
FIG. 2 is a call flow diagram for a system similar to that of FIG. 1.

FIG. 2 shows the corresponding call flow of the failure scenario of CSFB call delivery for a UE 110 that has traveled along mobility path 112 to position 4. In this regard, at 1*a*, in response to the arrival of a CS Incall request, the anchor MSC2 determines the message is for a UE currently served by the LTE so it sends a (tunneled) 1xRTT CS Page request message to the InterWorking System (IWS) that interworks with the LTE. The IWS passes the message to the Mobility Management Entity (MME). At 2*a*, if the UE is idle as determined by the MME, the MME performs network-initiated service request—as per 3GPP Technical Specifications (TS) 36.413 and TS 36.331. The RRC connection between the UE and eNB is brought up as a result of successful MME paging. At 3*a*, the MME tunnels the 1xRTT CS Page to the UE via eNB. At 3*c*, the UE sends a 1xRTT CS page response message to a 1xRTT cell that covers it in response to 3*a*. At 4*a*, since MME indicates CSFB, the eNB releases the RRC connection with the UE, which redirects the UE to 1xRTT for CSFB. At 4*c*, the 1xRTT cell passes on the 1xRTT Page Response message to the MSC to which it belongs. At 5*a*, the eNB informs the MME that the LTE radio connection with the UE has been released and requests the MME to release the UE context as a result. At 6*a*, the MME sends a message to the Serving GateWay (SGW) requesting the suspension of the bearer(s) associated with the UE. At 7*a*, the SGW sends an acknowledgment back to the MME. Please note step 3*c* and step 4*c* wherein the unsolicited page response is received at the border MSC. As shown, the call fails.

Figure 3:
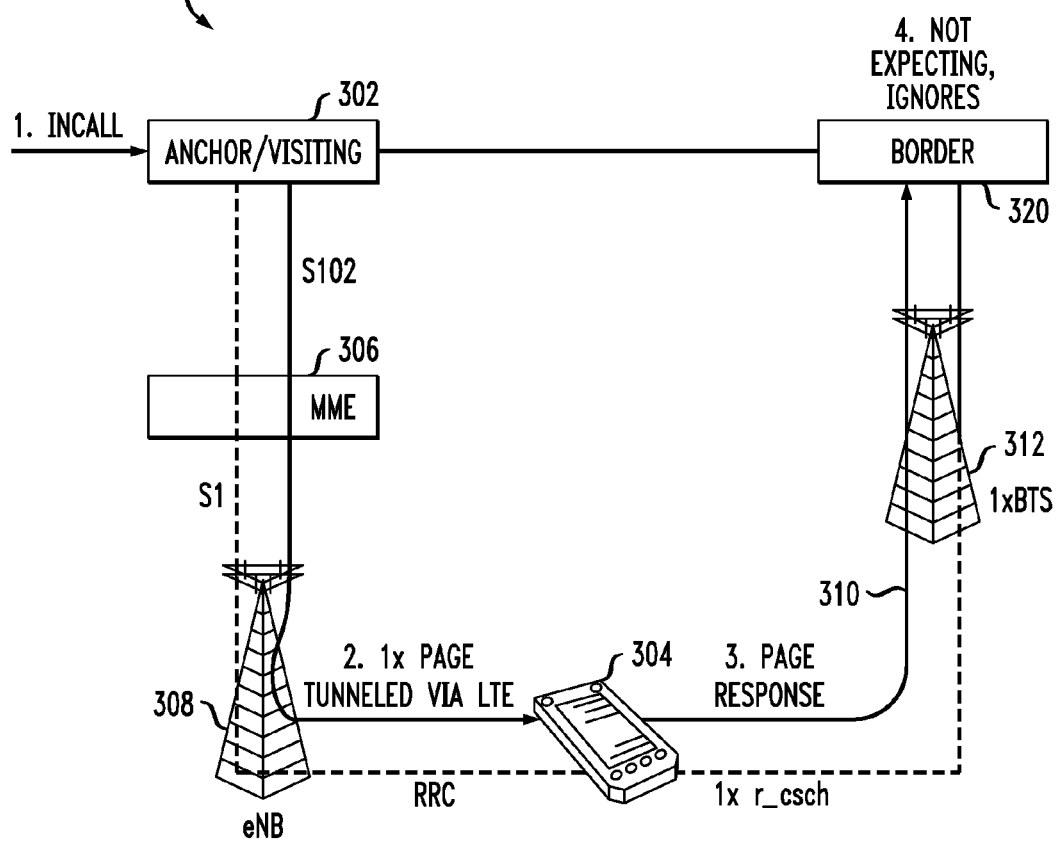
FIG. 3 is a block diagram illustrating operation of a system similar to that of FIG. 1.

FIG. 3 illustrates a network 300 and the call failure noted above and also identifies the various network elements (e.g. MME (Mobility Management Entity), eNB (Enhanced Node B)) as well as LTE tunnels used in Step-3*a* in FIG. 2. In this regard, in conventional LTE-1x Circuit Switched Fallback, the anchor/visiting MSC 302 (upon receipt of an incall) sends a 1x page via S102, S1 and LTE RRC tunneling to the UE 304. The path for the page is also defined by MME 306 and eNB 308. The UE 304 then sends the 1x page response natively over the 1x air interface 310, through a base station 312. In certain border conditions, it is possible for a CSFB UE to send a page response that is received by a different MSC (e.g. MSC 320) than the MSC 302 that had sent the tunneled page, as described in FIG. 2.

This scenario results in the call receiving default treatment (voice mail) rather than completing to the called party. 3GPP CSFB standards describe call flows that purely involve 1x pages sent over the S102, S1 and RRC (Radio Resource Control) tunnels. They do not contemplate notifying border MSCs or the use of 3GPP2 Border Cell Paging in conjunction with CSFB.

Figure 4:
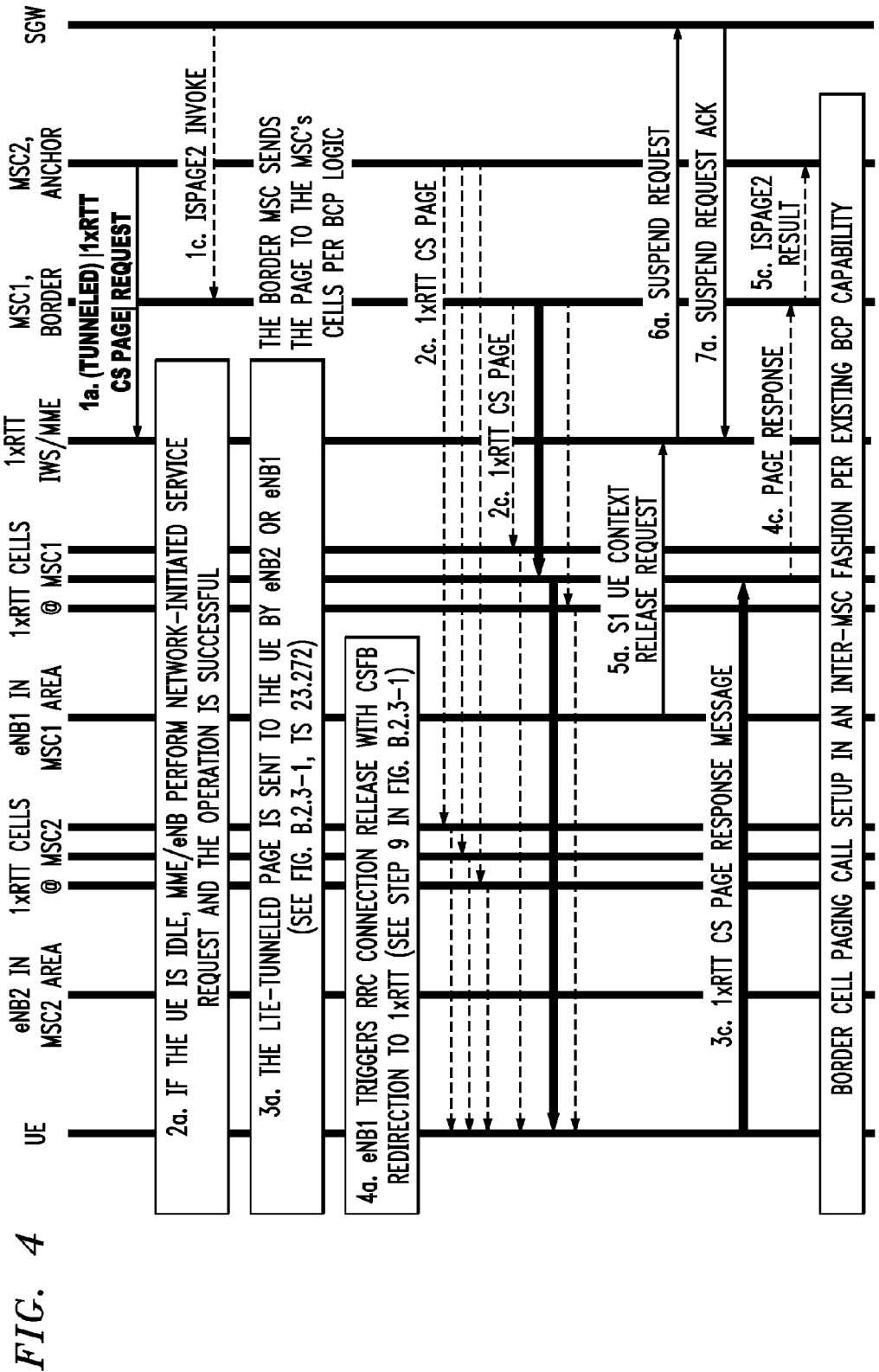
FIG. 4 is a call flow diagram for a system using border cell paging.

One embodiment of the invention that addresses the problem of call failure is to use 1xRTT border cell paging (BCP) capability, as shown in FIG. 4. In FIG. 4, steps labeled similar to steps of FIG. 2 are substantially the same and will not be described again for ease of explanation. However, additional steps will be described. For example, at 1*c*, the anchor MSC sends ISPAGE2 Invoke message(s) to border MSC(s) provisioned for this anchor MSC. At 2*c*, the border MSC sends 1xRTT Page messages to 1xRTT cells associated with the MSC. In the border MSC case, the 1xRTT page messages are triggered by the reception of the ISPAGE2 Invoke message by the border MSC. At 5*c*, the border MSC sends an ISPAGE2 Result message back to the anchor MSC in response to reception of the 1xRTT Page response message (4*c*).

To further explain, 1xRTT MSCs and Base Stations support Border Cell Paging (BCP) capability, where the anchor MSC requests border MSCs to page the mobile via a (standards based) IS-PAGE2 message. So, each border MSC pages the mobile on behalf of the anchor MSC. In this embodiment, if any border MSC receives a page response, it forwards it to the anchor MSC. The anchor MSC, the border MSC, and the border cell that receives the page response then set up the call in an inter-MCS fashion using inter-MSC SHO (soft handoff) to deliver the voice incall.

FIG. 4 illustrates the corresponding call flow using cross paging that solves the problem. The anchor MSC will use the BCP by sending ISPAGE2 Invoke to border MSCs in addition to sending the page message to the 1xCS IWS (InterWorking System) and MME. In the figure, both border MSCs and anchor MSC will page the UE (step-2*c*) but only one of such page messages will be responded by the UE (shown in the thicker lines in the figure). The techniques of the presently described embodiments are invoked when the UE is in either an active (also known as connected) mode or idle mode. They maximize CSFB call delivery success rates and minimize call delivery setup time.

Another embodiment of the invention is the invocation of the "listen only" mode in ISPAGE2 Invoke in the first page attempt to cross-RAT page the UE for call delivery. This embodiment suppresses actual sending of page messages by the 1xRTT border cells to the UE when the LTE side is also to page the UE. As a result, unnecessary cross-paging overhead is eliminated.

This embodiment uses BCP to address the CSFB call delivery failure problem and also avoids paging resources waste at the border MSCs when the LTE side is also to page the UE. To eliminate unnecessary paging at the border MSCs, the anchor switching element such as an anchor MSC specifies PageInd='Listen only' in the ISPAGE2 Invoke message so that the border MSC will suppress sending the page messages to its cells (which are the border cells from the anchor MSC perspective). This avoids wasting page resources as the UE is being paged by the LTE side and will send an unsolicited page response message to a 1xRTT cell without any 1xRTT cell to actually page it.

Figure 5:
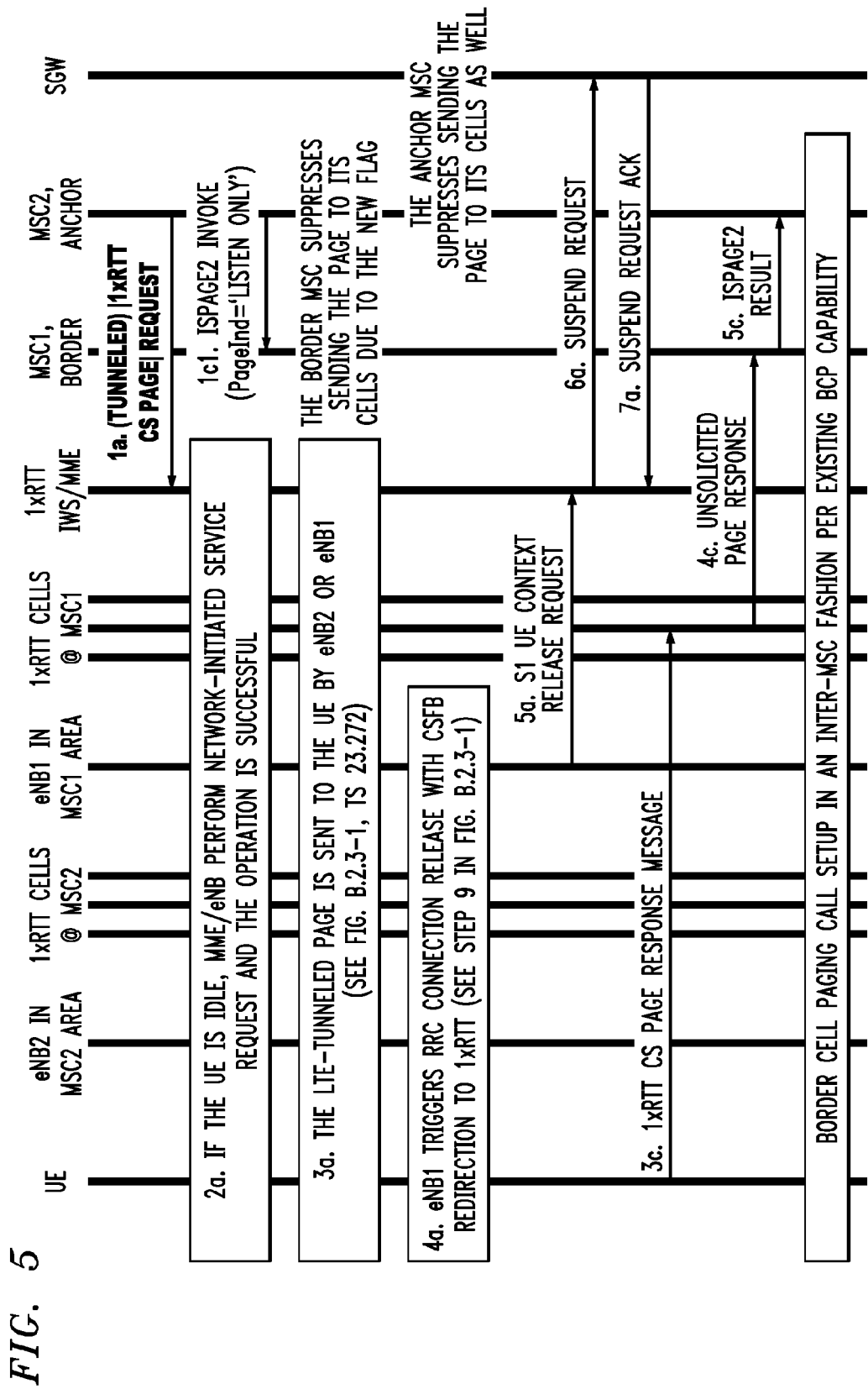
FIG. 5 is a call flow diagram for a system implementing another embodiment of the present invention.

FIG. 5 provides a call flow of a system into which the presently described embodiments may be incorporated. It should be appreciated that like-numbered steps in FIGS. 2, 4 and 5 correspond to one another. As such, for ease of explanation, the like-numbered steps will not be described again. However, note that in step-1c1, the border MSC suppresses sending page messages to the cells (when the "listen only" indicator is present in the ISPAGE2 Invoke message) and, thus, avoids paging resources waste. If the border MSC then receives an unsolicited page response, as shown in step-3c/4c in FIG. 5, the border MSC knows where to forward the page response message as a result of the ISPAGE2 Invoke message received earlier in step-1c1. The end result is a successful CSFB call delivery setup without additional delay and without unnecessary paging overhead.

Figure 6:
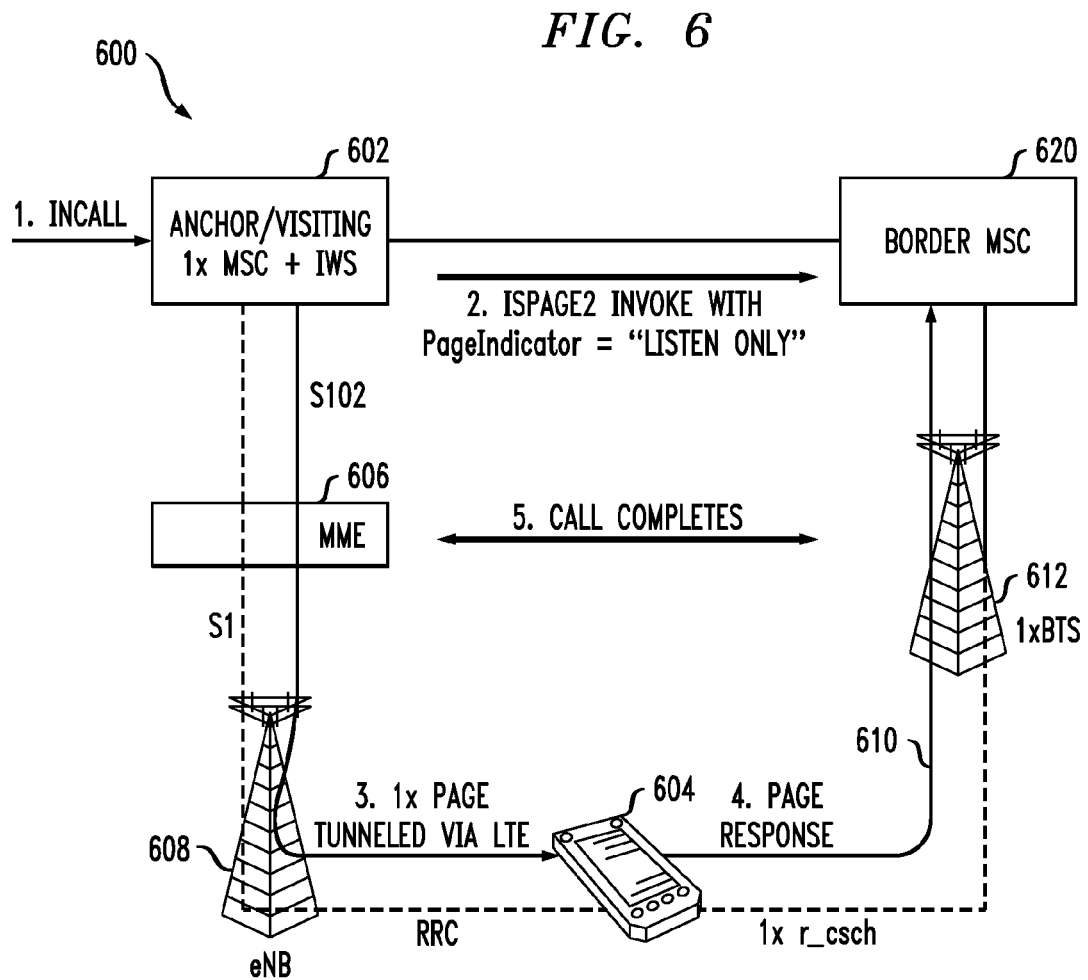
FIG. 6 is a block diagram illustrating operation of a system similar to that of FIG. 5.

With reference now to FIG. 6, a portion of a network 600 is shown wherein CSFB procedures are combined with 3GPP2 ISPAGE2 Invoke and Border Cell Paging procedures. At the same time or immediately prior to a 1x page being sent over S102, ISPAGE2 Invoke messages with a PageIndicator of "listen only" will be sent to border MSCs. When the page response arrives at the border MSC, the call will complete according to existing ISPAGE2 and either soft handoff or hard handoff procedures as appropriate.

As shown in FIG. 6, an incall arrives at an MSC 602 that is serving as the Anchor/Visiting MSC for a UE 604 that has pre-registered as a CSFB UE.

An ISPAGE2 Invoke message is sent to Border MSCs (such as border MSC 620) with a PageIndicator of "listen only". The page is tunneled through LTE signaling to the UE 604 via MME 606 and eNB 608. The UE 604 sends a page response over the 1x air interface 610 to the border MSC 620 via base station 612. The call completes according to existing 1x procedures.

Another embodiment of the invention is dynamic invocation of proper form of ISPAGE2 with or without actual paging at border switching elements such as Border MSCs to ensure successful call delivery rates in cross-paging even when the LTE network is in overload. An example is shown in FIG. 7, where the UE 710 in idle mode is either within the TA coverage area (see the UE labeled "1"), or just moves (at least partly along mobility path 712) into 1xRTT-only coverage area without 1xRTT re-registration due to some hysteresis delay (see the positions off path 712 labeled "2-x" and "2-y"). For completeness, a network area 700 includes a tracking area 702 having a plurality of cells 708 corresponding to LTE eNB elements. In addition, MSC1 includes a plurality of cells 704 and MSC2 includes a plurality of cells 706.

In these situations depicted in FIG. 7, when a (tunneled) 1xRTT page arrives, as shown in FIG. 5 (Step-1a), the page ("network-initiated service request") attempts by the MME in Step-2a can fail if the LTE (eNBs) are in overload in the former case, and will fail if the UE happens to be out of the TA in the latter case. As a result, the UE will not perform Step-3c and thus the ISPAGE2 attempts (in Step-1c1 in FIG. 5) will fail after timeout. The Anchor MSC would then try a $2^{nd}$ page attempt during which the MME (in Step-2a in FIG. 5) may include not only the last-seen TA but also the neighbor TAs of the last-seen TA in an attempt to reach the UE. If the eNBs are already in overload, however, the increase of the paging areas in the $2^{nd}$ page attempt would make the overload situation even worse. If the eNBs are in the boundary of getting into overload, the $2^{nd}$ page attempt can trigger eNBs into overload.

Figure 8:
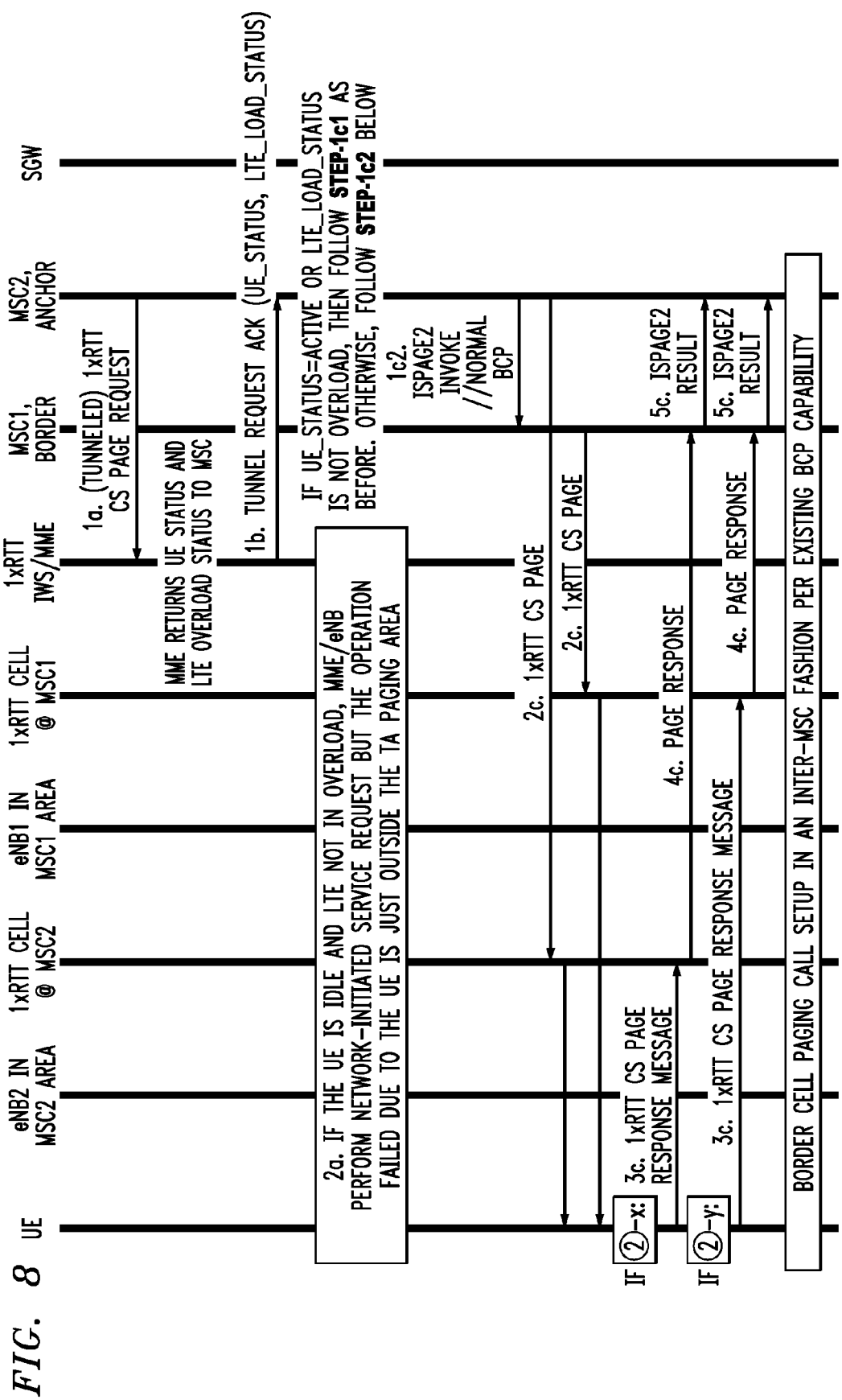
FIG. 8 is a call flow diagram for a system implementing another embodiment of the present invention.

With reference now to FIG. 8, the problematic situation described with reference to FIG. 7 and FIG. 5 is addressed by adding a new Step-1b (in FIG. 8) to inform the anchor MSC about the UE status and LTE overload status. It should be appreciated that like-numbered steps in FIGS. 2, 4, 5 and 8 correspond to one another. As such, for ease of explanation, the like-numbered steps will not be described again. However, variations according to the embodiment of FIG. 8 will be described for completeness. So, at 1a, a (tunneled) 1xRTT CS Page Request is sent to the MME. At 1b, the MME responds with a Tunnel Request Acknowledgement message. The tunnel request acknowledgement would be sent by the MME in response to any 1x message sent to it by the MSC to be delivered to the UE. This tunnel request acknowledgement can hence be used to aid other scenarios in addition to paging for incoming 1x voice calls. Nonetheless, the Tunnel Request Acknowledgement message, in this form, indicates UE status and LTE loading status. The UE status (idle or active) is known to the MME; the LTE loading status can be estimated by the MME or obtained by other suitable techniques. The anchor MSC performs Step-1c1 as in FIG. 5 if the UE is active, or it is idle and there is no overload on the LTE.

Note that upon reception of the message in 1a, the LTE elements such as the MME capable of 1b will not page (e.g. will suppress paging) the UE if the UE is idle and the LTE is in overload.

If the UE is idle and LTE is in overload, the anchor MSC performs Step-1c2 in FIG. 8 instead to alleviate the LTE overload/congestion while still ensuring $1^{st}$ page successful rates and call delivery setup time. Step-1c2 in FIG. 8 is equivalent to Step-1c in FIG. 4. Similarly, if the anchor MSC has performed Step-1c1 as in FIG. 5 for the $1^{st}$ page attempt but no 1xRTT page response was received making a $2^{nd}$ page attempt necessary, the anchor MSC also performs Step-1c2 in FIG. 8 for the $2^{nd}$ page attempt, and any other subsequent page attempts (if desired).

Thus, this embodiment provides dynamic invocation of proper form of ISPAGE2 with or without actual paging at Border MSCs to ensure successful call delivery rates in cross-paging even when the LTE network is in overload, as shown in FIG. 8.

The description and figures herein use examples of network elements and scenarios to describe the invention. For instance, MSCs are used as examples of switching elements. Specific examples of other network elements are also shown. However, it should be appreciated that these examples should not be limiting. Other suitable network elements may alternatively be used to implement the subject invention. In addition, UEs may take a variety of known forms.

Moreover, the invention may be implemented using a variety of hardware configurations and software routines. In this regard, it should be appreciated that block diagrams, call flow diagrams and the like represent various processes which may be substantially represented in computer readable medium and so executed by a computer or processor configured or operative to so execute, whether or not such computer or processor is explicitly shown. For example, routines may be run by processors of a switching element, such as an anchor MSC, to send messages as described herein. Likewise, routines may be run by processors of another switching element, such as a border MSC, to receive and recognize the messages, as well as act accordingly.

The above description merely provides a disclosure of particular embodiments of the invention and is not intended for the purposes of limiting the same thereto. As such, the invention is not limited to only the above-described embodiments. Rather, it is recognized that one skilled in the art could conceive alternative embodiments that fall within the scope of the invention.

We claim:

1. A method for call delivery in a network area including a first area served by a first switching element and a second area served by a second switching element, the first and second areas being served by Long Term Evolution (LTE) elements, user equipment (UE) being located in the second area, the method comprising:
    receiving a call for the user equipment at the first switching element;
    sending a page request to the user equipment by the first switching element via the LTE elements;
    sending a page invoke message by the first switching element to a plurality of switching elements on a border between the first area and the second area, the page invoke message having an indicator field indicating a status of listen only;
    receiving a page response from the user equipment at the second switching element;
    recognizing the page response by the second switching element based on the page invoke message; and,
    completing the call to the user equipment.

2. The method as set forth in claim 1 wherein the first switching element is an anchor switching element.

3. The method as set forth in claim 1 wherein the second switching element is a border switching element.

4. The method as set forth in claim 1 wherein the page request is a (tunneled) 1xRTT CS page request.

5. The method as set forth in claim 1 wherein the page invoke message is an ISPAGE2 Invoke message.

6. The method as set forth in claim 1 wherein the indicator field is a PAGE Indicator field.

7. The method as set forth in claim 1 wherein the page response is a 1xRTT CS page response.

8. The method as set forth in claim 1 further comprising sending a tunnel request acknowledgement by the LTE elements indicating a status of the user equipment and the LTE elements.

9. The method as set forth in claim 8 further comprising suppressing paging the UE by the LTE elements if the UE is idle and the LTE is in overload.

10. The method as set forth in claim 8 wherein the page invoke message is sent with the indicator field indicating listen only if the status of the user equipment is active or the status of the LTE elements is not overload.

11. The method as set forth in claim 8 wherein the page invoke message is sent without the listen-only indication in the indicator field if the status of the user equipment is idle and the status of the LTE elements is overload, or if attempting a subsequent page.

12. The method as set forth in claim 1 further comprising receiving a tunnel request acknowledgement indicating a status of the user equipment and the LTE elements.

13. A system for call delivery in a network area including a first area and a second area, the first and second areas being served by Long Term Evolution (LTE) elements, user equipment being located in the second area, the system comprising:
    a first switching element configured to receive a call for the user equipment, send a page request to the user equipment via the LTE elements and send a page invoke message to a plurality of switching elements on a border between the first area and the second area, the page invoke message having an indicator field indicating a status of listen only; and,
    a second switching element configured to receive a page response from the user equipment, recognize the page response based on the page invoke message and complete the call to the user equipment.

14. The system as set forth in claim 13 wherein the first switching element is an anchor switching element.

15. The system as set forth in claim 13 wherein the second switching element is a border switching element.

16. The system as set forth in claim 13 wherein the page request is a (tunneled) 1xRTT CS page request.

17. The system as set forth in claim 13 wherein the page invoke message is an ISPAGE2 Invoke message.

18. The system as set forth in claim 13 wherein the indicator field is a PAGE Indicator field.

19. The system as set forth in claim 13 wherein the page response is a 1xRTT CS page response.

20. The system as set forth in claim 13 wherein the LTE elements send a tunnel request acknowledgement indicating a status of the user equipment and the LTE elements.

21. The system as set forth in claim 20 wherein the LTE elements suppress paging the UE if the UE is idle and the LTE is in overload.

22. The system as set forth in claim 20 wherein the first switching element sends the page invoke message without the listen-only indication in the indicator field if the status of the user equipment is idle and the status of the LTE elements is overload, or if attempting a subsequent page.

23. The system as set forth in claim 13 wherein the first switching element is operative to receive a tunnel request acknowledgement indicating a status of the user equipment and the LTE elements.

24. The system as set forth in claim 23 wherein the page invoke message is only sent with the indicator field indicating listen only status if the status of the user equipment is active or the status of the LTE elements is not overload.

\* \* \* \* \*